Figure 1:
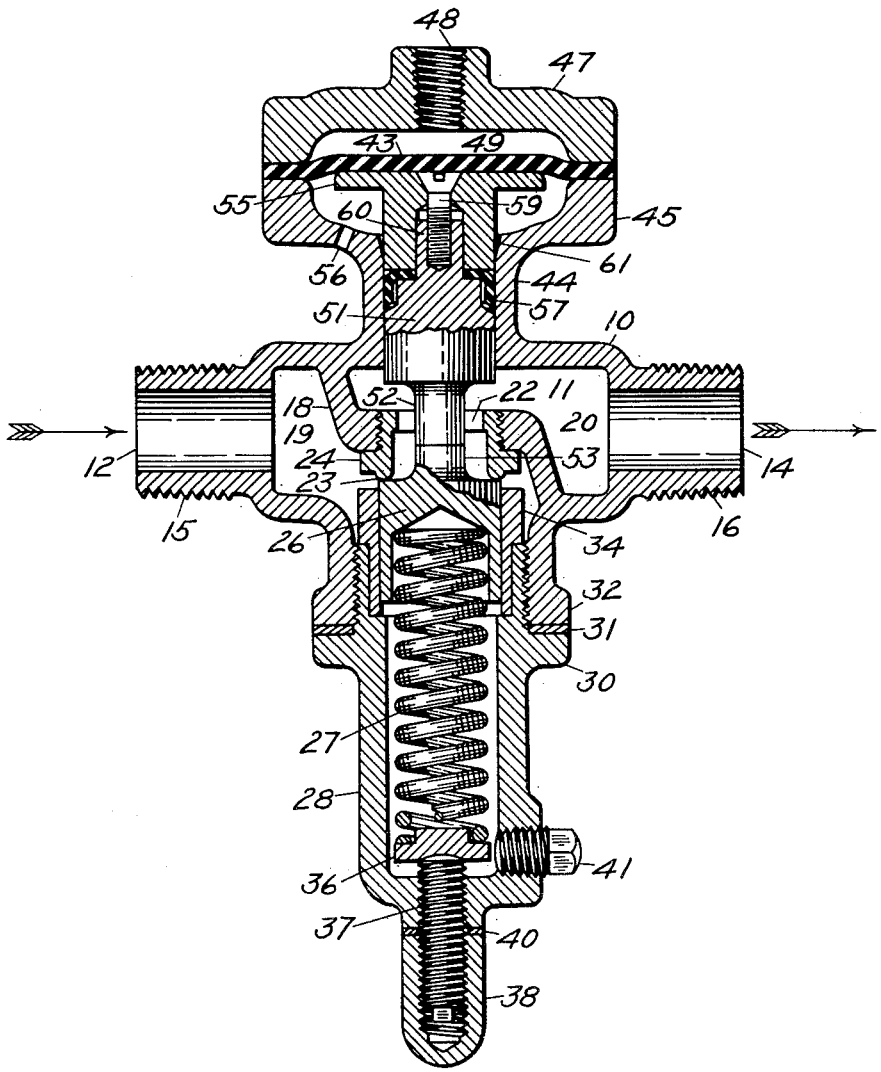

Patented Dec. 12, 1933

1,939,150

UNITED STATES PATENT OFFICE 1,939,150

UNLOADING VALVE

Charles M. Terry, Decatur, Ill., assignor to A. W. Cash Company, Decatur, Ill., a corporation of Delaware Application June 8, 1931. Serial No. 542,762

1 Claim. (Cl. 137—153)

This invention relates to unloading valves, and more particularly to a valve of this type which is adapted for use in a hydraulic system including a pump and which will open automatically to relieve the discharge pressure of the pump whenever this pressure tends to become excessive as a result of a decrease in the demand for fluid.

In washing automobiles it is customary to use a water discharge nozzle or so-called "gun" which is supplied with water at high pressure from a pump driven by an electric motor. The inlet of the pump is usually connected to the city water supply, and a manually operable valve is provided to control the flow through the nozzle. So long as this valve is wide open and the nozzle is capable of handling the entire discharge capacity of the pump, no difficulty will arise. There are times, however, when it is desired to reduce the nozzle discharge by closing the manually operable valve either partly or entirely, and this will increase the discharge pressure of the pump and overload or stall the driving motor unless some means is provided to relieve the pressure. Moreover, when there is no demand for water, it is desirable in the interest of economy of operation that the pump should operate under substantially no-load conditions, the discharge pressure only slightly exceeding the inlet pressure.

These problems have been recognized and various constructions have been proposed in the past for overcoming these various difficulties. The prior devices have however been complicated, bulky and expensive. Moreover, many of them have been so arranged that variations in the fluid pressure at the pump inlet would change the adjustment of the unloading valve and cause it to unload at different pressures, which is undesirable.

It is accordingly the main object of my invention to provide an unloading valve which is simple, compact and inexpensive, and particularly to provide such a valve which will open at a definite predetermined pressure that is unaffected by variations in the pressure at the inlet of the pump.

With this and other objects in view, as will be apparent to those skilled in the art, my invention resides in the combination of parts set forth in the specification and covered by the claim appended hereto.

In accordance with my invention I provide a device which by-passes the fluid discharged by the pump whenever the valve at the fluid discharge nozzle is closed. This device comprises a casing which forms a passage for the flow of water or other fluid between an inlet and an outlet. The flow through the passage is controlled by a slidable valve which is normally held in a closed position by a compression spring when the fluid is flowing from the nozzle. The spring is preferably mounted in a hollow spring chamber supported on the casing. On the opposite side of the casing from the spring chamber, I provide a pressure chamber within which a pressure responsive member, such as a flexible diaphragm, is mounted. This diaphragm is adapted to be exposed on one side to the fluid pressure anterior to the nozzle valve, and on the other side to atmospheric pressure. The diaphragm is connected to the slidable valve and arranged to open it whenever the nozzle valve is closed and the controlling pressure reaches a sufficiently high value to overcome the force of the spring, thus allowing the pump to discharge fluid without material resistance. The connection between the diaphragm and the slidable valve comprises a plunger slidable within a cylinder, and sealing means is provided to prevent the escape of fluid past the plunger.

Figure 2:
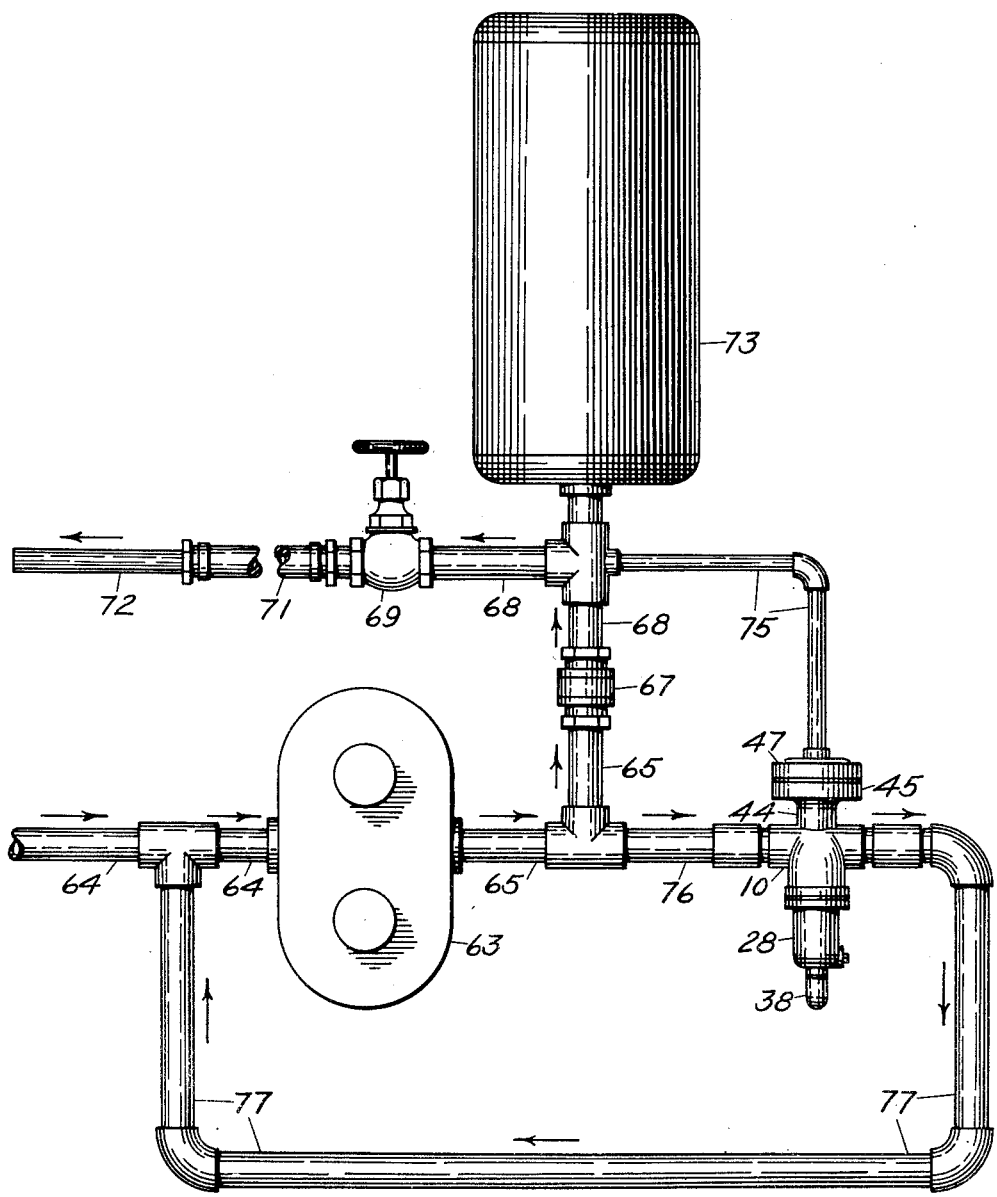

Referring to the drawings illustrating one embodiment of the invention, and in which like reference numerals indicate like parts, Fig. 1 is a section through the center of an unloading valve; and Fig. 2 is a somewhat diagrammatic elevation showing the unloading valve assembled with other devices to form an automobile washing apparatus.

The embodiment illustrated in the drawings comprises a hollow casing 10 shaped to provide a horizontal passage or conduit 11 leading from an inlet opening 12 to an outlet opening 14. The inlet and outlet are on opposite sides of the casing and in direct line with each other, a construction which facilitates manufacturing operations and simplifies the piping connections to the device. I have indicated external screw threads 15 and 16 on the casing adjacent to the inlet and outlet respectively for connection purposes, but it will be clear that internal screw threads may be used instead, or other equivalent means provided. A Z-shaped partition 18 extends diagonally across the conduit 11 and divides the interior of the casing into an inlet chamber 19 beneath the partition and adjacent to the inlet 12 and an outlet chamber 20 above the partition and adjacent to the outlet 14. This partition is provided with a central opening 22 surrounded on the lower side of the partition by an annular valve seat 23. This valve seat is preferably formed on a ring 24 which is screw threaded into the opening in the partition. With this construction, the valve seat can be formed of a different and more durable material from the casing 10.

A vertically slidable valve 26 is mounted directly beneath the valve seat 23 and arranged to cooperate therewith in controlling the flow through the conduit 11. This valve 26 is recessed from beneath to receive the upper end of a coiled compression spring 27 which urges the valve upwardly to its closed position against the seat 23. The spring 27 is enclosed in a hollow spring chamber 28 which is screw threaded to the bottom of the casing 10. In order to prevent external leakage of fluid between these parts, a flange 30 is formed on the outside of the spring chamber and this flange serves to clamp an annular gasket 31 against a cooperating flange 32 on the casing 10. The valve 26 is cylindrical in shape and it is guided in its vertical movements by a sleeve 34 of a suitable non-corrosive material which is firmly pressed into the upper end of the spring chamber 28. The sleeve 34 fits the outside of the valve rather loosely to avoid friction and binding, and to allow fluid to enter or leave the spring chamber as the valve moves up or down, thereby providing a dash pot action which greatly smooths out the operation of the valve. With this construction the lower surface of the valve is subjected to the fluid pressure existing in the inlet chamber 19.

The lower end of the spring 27 is supported on a circular disk or button 36 which in turn rests on the upper end of a vertical adjusting screw 37 threaded through the lower end of the spring chamber. A hollow cap 38 is screwed over the downwardly extending end of the screw 37, and an annular gasket 40 is provided between the cap and the spring chamber. This construction prevents leakage of fluid, and yet the spring tension can easily be adjusted by first removing the cap to expose the adjusting screw. A small pipe plug 41 is threaded horizontally into the wall of the spring chamber near the bottom thereof, so that water may be drained from the chamber when the valve is to be left exposed to freezing temperatures.

In order to open the valve 26 automatically when external conditions render such action desirable, I provide a suitable pressure responsive device, such as a flexible diaphragm 43. For the purpose of supporting this diaphragm, a short upwardly extending sleeve or cylinder 44 is formed integral with the casing 10 and in direct line with the valve, and an annular flange 45 is provided at the top of this sleeve. The diaphragm 43 is clamped at its periphery between this flange 45 and a cap or plate 47 which is fastened to the flange by bolts (not shown). Both the flange 45 and the cap 47 are formed with a concave surface adjacent to the diaphragm, so that the latter may move freely in a vertical direction. A tapped hole 48 is provided in the center of the cap 47 in order that fluid pressure may be transmitted to the pressure chamber 49 between the cap and the diaphragm.

The diaphragm is connected to actuate the valve 26, and for this purpose I provide a cylindrical plunger 51 which is slidable vertically within the sleeve 44 and in direct axial alignment with the valve. A downwardly extending projection 52 of reduced diameter is formed at the lower end of the plunger to contact with a similar upwardly extending projection 53 on the valve. It will be clear that if desired a single projection of increased length may be provided on either the plunger or the valve instead of the two projections illustrated. The lower surface of the diaphragm contacts with the upper end of the plunger, which is provided with an outwardly extending annular flange 55 forming an increased supporting area for the diaphragm.

In order that a definite predetermined pressure in chamber 49 may open the valve 26, regardless of variations in pressure in the outlet chamber 20, the flange 45 is provided with a vent 56 which leads to the space below the diaphragm and ensures the maintenance of atmospheric pressure within this space. Moreover, the plunger 51 preferably has a diameter substantially the same as that of the valve seat 23, so that a pressure change in the outlet chamber 20 will act equally against the valve and the plunger, and hence will have no effect on the operation of the device. For the purpose of preventing leakage of fluid from the outlet chamber 20 past the plunger 51, I have shown an annular cup packing 57. The plunger 51 is divided into an upper and a lower portion, and the cup packing is clamped between these parts by a countersunk head screw 59 which extends downwardly through the upper part of the plunger and is threaded into the lower part thereof. An extension 60 of reduced diameter extends upwardly from the lower portion of the plunger into a correspondingly dimensioned recess in the upper portion to hold these members in accurate alignment. The upper end of the sleeve 44 is beveled slightly at 61 to assist in sliding the plunger and the cup packing into place at assembly.

Referring now to Fig. 2 of the drawings, my improved unloading valve is there shown installed in connection with other parts to form an automobile washing apparatus. I have illustrated a pump 63, which may be of the geared rotary type, and which may be driven by an electric motor (not shown). The pump is supplied with water from a suitable source, such as the city water supply, through a pipe line 64, and the discharge of the pump is connected by a pipe line 65, check valve 67, pipe line 68, manually operable valve 69, and flexible hose 71 to a water discharge nozzle or "gun" 72. An air chamber 73 is connected to the pipe line 68 and subjected to the pressure therein. The diaphragm chamber 49 of the unloading valve is likewise subjected to this same pressure through a pipe line 75 connecting the pipe line 68 with the opening 48 in the cap 47. The inlet 12 of the unloading valve is connected to the pipe line 65 by means of a pipe 76, and the outlet 14 of the unloading valve is connected to the pipe line 64 by means of a pipe line 77.

The operation of the invention will now be clear from the above disclosure. The pump 63 may receive city water at a pressure of perhaps 50 pounds per square inch and deliver the water at a pressure of say 300 pounds. The unloading valve may be adjusted to open at a pressure of say 320 pounds. So long as the manually operable valve 69 is wide open and the nozzle 72 is discharging the full capacity of the pump, check valve 67 will be open and the unloading valve 26 will be held closed by the spring 27. If now the manually operable valve 69 is closed, the pressure in pipe lines 65, 68, 75 and air chamber 73 will increase to 320 pounds, and this pressure acting on the diaphragm 43 will be sufficient to overcome the force of spring 27 and the fluid pressure acting on the lower side of valve 26, and immediately open the valve. The pressure in pipes 65 and 76 will at once drop to a value only slightly exceeding the city water pressure, and the pump will circulate water freely and without any material resistance through pipe 76, the unloading valve, and pipe line 77 back to the pump inlet pipe 64. Check valve 67 will close, trapping the 320 pound pressure in the air chamber 73 and thus holding the unloading valve open. When the valve 69 is again opened to allow water to flow from the nozzle 72, the pressure in the air chamber 73 will immediately decrease, spring 27 will close the unloading valve 26, the water discharged by the pump will open the check valve 67 and flow through pipe 68, valve 69 and hose 71 to nozzle 72, and the discharge pressure at the pump will increase to 300 pounds. If the valve 69 is closed part way to reduce the flow through the nozzle, the excess water discharged by the pump will be by-passed through the unloading valve without overloading the motor which drives the pump.

The unloading valve is of simple compact construction, and formed of a few parts, all of which can be easily machined and assembled. When the device is in use, the pump inlet pressure is of course effective in the outlet chamber 20, and if this pressure changes, say from 50 pounds to 100 pounds, the tendency of this increased pressure to open the valve 26 by acting on the upper surface thereof is balanced by the increased pressure on the lower face of the plunger 51, which has the same area. The cup packing 57 and vent 56 prevent this fluid from reaching the diaphragm 43 and building up pressure thereagainst. As a result the valve will always open at a definite predetermined pressure which is unaffected by variations in the city water pressure.

In the claim appended hereto I have for convenience used such expressions as "horizontal", "above", "beneath", etc., in order to set forth the claimed structure more clearly. It is to be understood, however, that my improved unloading valve will operate in positions other than that illustrated, and that these expressions are not to be considered as limitations except in so far as they define the positions of the parts of the unloading valve itself relative to each other.

Having thus described my invention, what I claim as new and desire to secure by Letters Patent is:

An unloading valve comprising a casing shaped to provide a horizontal passage for the flow of fluid between an inlet and an outlet located on opposite sides of the casing and in direct line with each other, a Z-shaped partition extending diagonally across the passage and dividing the passage into an inlet chamber adjacent to the inlet and beneath the partition and an outlet chamber adjacent to the outlet and above the partition, said partition having an opening therethrough, a ring mounted within the opening and providing an annular valve seat on the lower side of the partition, a cylindrical valve slidable vertically directly beneath the opening and arranged to control the flow therethrough, a coiled compression spring beneath the valve arranged to urge the valve upwardly against the valve seat, a hollow spring chamber enclosing the spring and fastened to the bottom of the casing, a sleeve mounted within the upper end of the spring chamber and forming a guide for the valve, a vertically adjustable support within the spring chamber for the lower end of the spring, a short cylinder integral with the casing and extending upwardly therefrom above and in axial alignment with the valve, an annular flange at the top of the cylinder, a flexible diaphragm in contact with the flange, a cap above the diaphragm and serving to clamp the peripheral portion of the diaphragm against the flange, said cap having an opening therethrough for connection to a pressure transmitting pipe and both the flange and cap being formed with a concave surface adjacent to the diaphragm to permit free vertical movement thereof, said flange having an opening therethrough to ensure the existence of atmospheric pressure on the lower surface of the diaphragm, a plunger slidable vertically in the cylinder and having a diameter substantially equal to the diameter of the valve seat, said plunger being formed of an upper and a lower portion, the upper portion having a flange thereon providing an increased supporting area for the diaphragm, and an annular cup packing clamped between the two portions of the plunger and serving to prevent leakage of fluid from the outlet chamber past the plunger.

CHARLES M. TERRY.